United States Patent [19]

Kuwahara et al.

[11] Patent Number: 4,947,388
[45] Date of Patent: Aug. 7, 1990

[54] CELL SWITCHING SYSTEM OF ASYNCHRONOUS TRANSFER MODE

[75] Inventors: Hiroshi Kuwahara, Kodaira; Mineo Ogino, Hanno; Takahiko Kozaki, Koganei; Noboru Endo, Hachioji; Yoshito Sakurai, Yokohama, all of Japan

[73] Assignees: Hitachi, Ltd.; Link Laboratory, Inc., both of Tokyo, Japan

[21] Appl. No.: 333,282

[22] Filed: Apr. 5, 1989

[30] Foreign Application Priority Data

Apr. 6, 1988 [JP] Japan .................................. 63-82909

[51] Int. Cl.[5] ............................................. H04Q 11/04
[52] U.S. Cl. ...................................... 370/60; 370/94.1
[58] Field of Search ............................. 370/60.94, 82;
340/825.52

[56] References Cited

U.S. PATENT DOCUMENTS

| | | | |
|---|---|---|---|
| 4,536,872 | 8/1985 | Lahti | 370/82 |
| 4,734,907 | 3/1988 | Turner | 370/94 |
| 4,740,958 | 4/1988 | Duxbury et al. | 370/94 |
| 4,748,619 | 5/1988 | Vigarie et al. | 370/94 |
| 4,755,986 | 7/1988 | Hirata | 370/94 |
| 4,823,340 | 4/1989 | Grassman et al. | 370/60 |

FOREIGN PATENT DOCUMENTS

0135994  8/1984  Japan .................................. 370/60

Primary Examiner—Douglas W. Olms
Assistant Examiner—Alpus H. Hsu
Attorney, Agent, or Firm—Antonelli, Terry, Stout & Kraus

[57] ABSTRACT

A fixed-length packet switching system, in which fixed-length packets (cells) each composed of a header portion and a data portion are received from a plurality of input lines, and after conversion of the header portions, the received packets are transmitted onto selected ones of output lines designated by their header portions. The system includes a buffer memory having a first buffer area composed of a plurality of subsidiary areas for accumulating cells correspondingly to the output lines, and a second buffer area for accumulating broadcast cells to be transmitted to selected ones of the plurality of output lines; a packet reading circuit for reading the cells from the first buffer area successively corresponding to the output lines and for reading the broadcast cell from the second buffer area at a predetermined frequency; and a broadcast control circuit for reproducing a plurality of broadcast cells from the broadcast cells read from the second buffer area and for transmitting the plurality of reproduced broadcast cells, instead of the cells read from the first buffer area, onto the output lines. The buffer memory is divided into a plurality of buffer areas each corresponding to a respective output line and a packet writing circuit generates addresses sequentially for the respective buffer areas to store cells in a buffer area according to the header portion thereof.

7 Claims, 8 Drawing Sheets

CELL SWITCHING SYSTEM OF ASYNCHRONOUS TRANSFER MODE

BACKGROUND OF THE INVENTION

The present invention generally relates to cell switching systems and, more particularly, relates to a cell switching system using an asynchronous transfer mode which is a mode for realizing a broad-band multimedia switching system.

A cell switching system of asynchronous transfer mode (hereinafter referred to as "ATM cell switching system") having such a configuration as disclosed in Japanese Patent Publication JP-A-59-13599 is known. The principle of operation of the ATM cell switching system of the JP-A-59-13599 will be described briefly with reference to FIG. 1. In the following description, each cell (which is also called a "packet") 10 to be switched is assumed to have a fixed length of 35 bytes composed of a 3-byte header 12 and a 32-byte user data portion 11 as shown in FIG. 2. The header 12 includes a logical channel number (hereinafter abbreviated to "LCN") for identifying the logical channel to which the cell belongs. Cell switching is executed by identifying the destination of the cell at every switching node on the basis of the LCN.

The above-mentioned values of the respective byte lengths of the entire cell, the header and the data are determined for convenience' sake of explanation, while those values are not determined on the basis of the basic principle of the present invention.

Figure 1:
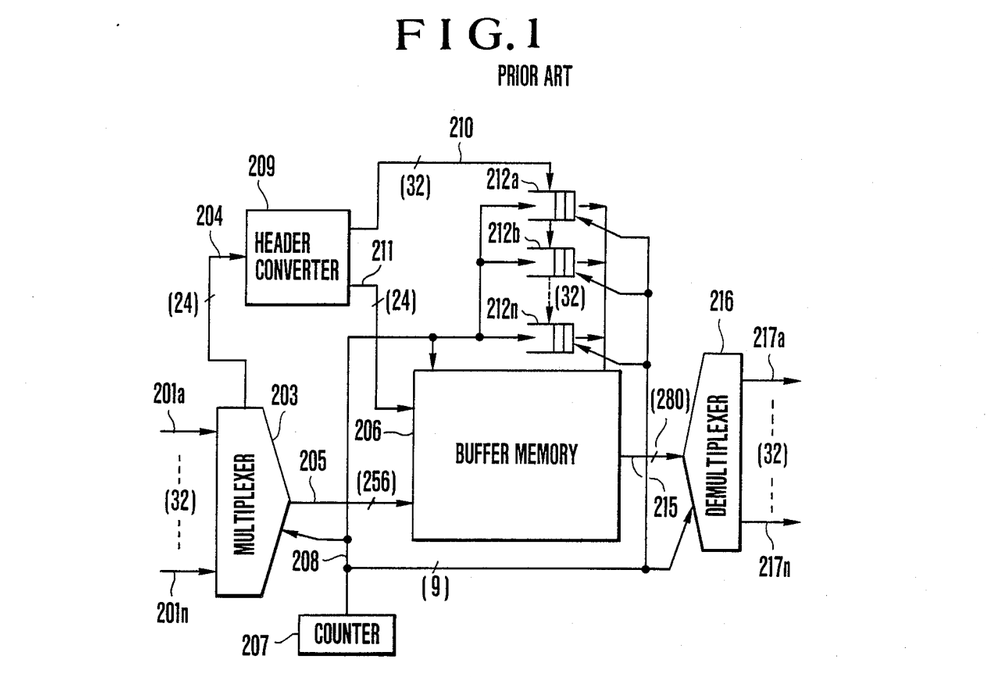
FIG. 1 is a diagram showing an example of the construction of the whole of a conventional switching system.
Figure 2:
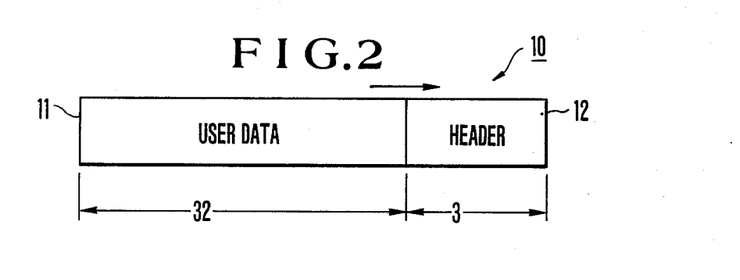
FIG. 2 is a view of the construction of an ATM cell.

FIG. 1 shows a basic construction of the conventional ATM cell switching system provided with 32 input lines $201a$–$201n$ and 32 output lines $217a$–$217n$. Such a cell 10 as shown in FIG. 2 is periodically applied to each of the 32 inputs $201a$ to $201n$ synchronously with each other. The respective input cells are converted from serial data into parallel data by means of a multiplexer circuit 203 so that the respective headers of the input cells are multiplexed and transferred onto a line 204 and the respective user data of the input cells are multiplexed and transferred onto a line 205. The line 204 is used for transferring parallel data of 24 bits (3 bytes) and the line 205 is used for transferring parallel data of 256 bits (32 bytes). The user data is written in an input-line-corresponding buffer memory 206 while the address of the user data is designated by an output line 208 of a counter 207. In this example, the output from the counter 207 is composed of 9 bits in which the upper 5 bits are used for designating any one of the input lines $201a$ to $201n$. The buffer memory 206 has a memory capacity for 16 cells corresponding to each of the input lines. The lower 4 bits of the counter 207 are used for designating the cell address successively. Accordingly, the buffer memory 206 operates to successively store cells 10 periodically applied through the input lines into addresses designated by the counter 207, so that writing of cells in the whole cell area of the buffer memory 206 is perfected in 16 periods. Thereafter, writing of cells is performed periodically so that new cells are successively overwritten in the area where old cells have been written. Accordingly, unless a cell stored in the buffer is read out of the buffer within 16 periods so as to be sent out through a switching system, the old cell will be lost in the switching system because a new cell will be overwritten on the old cell.

On the other hand, the headers 12 of respective cells 10 are fed to a header converter circuit 209 through the line 204. For example, the header converter circuit 209 may be constituted by a memory table. The memory table is read by an address determined by a combination of the LCN contained in the header of a cell and the number of the input line through which the cell is applied, so that routing data of the header, that is to say, an output line number and an LCN (generally, different from the LCN contained in the input header) for identifying the cell on the output line, are fed onto lines 210 and 211, respectively. The output line number on the line 210 is composed of 32 bits which respectively correspond to the output lines. The output line number indicates the fact that the cell will be transmitted to the output lines corresponding to the bit position where the bit takes "1". The LCN appears on the line 211 in synchronism with the writing of the user data of the cell in the input-line-corresponding buffer memory 206, and is written into a cell area of the buffer memory together with the user data.

The address of the buffer memory 206 where the cell has been written is fed to a group of output queues $212a$ to $212n$ through the line 208 and is stored in one output queue designated by the output line number. The output queues $212a$ to $212n$ correspond to the output lines $217a$ to $217n$, so that the address on the buffer memory 206 for one cell to be outputted is stored in the corresponding one of the output queues for a corresponding one of the output lines. Those output queues $212a$ to $212n$ are successively designated by the output of the counter 207 so that the contents of the buffer memory 206 are read out corresponding to the successively designated contents of the output queues, that is, addresses, and outputted to a line 215. Accordingly, cells to be transferred onto the output lines $217a$–$217n$ exist on the line 215 in the multiplexed form. Those multiplexed cells are demultiplexed through a demultiplex circuit 216 and then the demultiplexed cells are respectively correspondingly transferred onto the 32 output lines $217a$ to $217n$.

The aforementioned ATM switching system however requires a switching function for broadcast mode. The broadcast mode is a mode in which one cell inputted through an input line is outputted onto a plurality of output lines. In the case of the conventional system as shown in FIG. 1, one and the same address of the buffer memory 206 is written in the plurality of output queues by putting "1" in a plurality of bit positions on the line 210. As a result, one and the same address can be read from the plurality of output queues when the cell is to be outputted, and accordingly, one and the same cell can be transferred onto the plurality of output lines.

In this case, it is a matter of course that the respective broadcast cells have not only one and the same data but also one and the same contents of the header. Accordingly, call control must be carried out on the assumption that the broadcast cells on the respective output lines have one and the same LCN.

The aforementioned conventional switching system has a problem that the quantity of hardware in the memory constituting the address queues $212a$–$212n$ becomes large. In particular, when priority, for example, classified by service classes, is established in handling cells in ATM switching, queues must be set as classified by service classes, so that the quantity of hardware is even further increased.

Further, in cell transmission in the broadcast mode, a broadcast cell is stored with one and the same address as the buffer memory 206, in each of the queues through which the broadcast cell is to be transmitted. Accordingly, a problem arises in that the capacity of the queues for storing cells belonging to other LCNs is reduced. For example, in the example shown in FIG. 1, it is a necessary and sufficient condition that the output queues have an address storage capacity for 16 periods, that is, for 16 cells, because the input-line-corresponding buffer memory 206 is always updated or overwritten with the passage of time of 16 periods or more. Accordingly, for example, in the case where 16 broadcast cells to be transmitted onto all the output lines are inputted in one period, all the queues are occupied by those broadcast cells so that other input cells become lost because of lack of vacant queues.

Even if the number of cells inputted in several periods before and after the period in which 16 broadcast cells are inputted is not so large that the total throughput in the switching system for the short duration or the throughput in every output line is within a limit of output throughput, lost cells may occur in case of instantaneous concentration of broadcast cells. This is a serious problem in the traffic performance of the switching system. To solve these problems by the conventional system construction, both the capacity of the queues 212a to 212n and the capacity of the input-line-corresponding buffer memory 206 must be increased. However, a disadvantage arises in that efficiency in use of the memory is lowered, because the increased portion of the buffer memory is not used when there is no concentration of broadcast cells.

SUMMARY OF THE INVENTION

The aforementioned problems are caused by the two characteristics of the conventional system as follows.
 (1) The buffer memory for storing cells is periodically updated regardless of existence of input cells.
 (2) Copies of the address designated for a broadcast cell are stored in the queues.

It is therefore an object of the present invention to provide a packet switching system in which the capacity of the buffer memory for storing cells or packets can be used efficiently.

It is another object of the invention to provide a packet switching system which is suitable particularly for switching broadcast cells.

In order to attain the foregoing objects, the cell switching system according to the present invention has a feature that writing of cells in the buffer memory is carried out only when cells are inputted and that in the case of a broadcast cell, a cell body and an address are stored during buffering in the switching system so that the necessary number of copies of the broadcast cell are generated when the broadcast cell is transmitted.

Describing more in detail, an aspect of the present invention is as follows.

In the cell switching system, in order to transmit fixed-length packets (or cells), each of which is composed of a header and a data portion and which are received in the form of multiplex data through a plurality of input lines, in the form of multiplex data onto selected ones of a plurality of output lines, an identifier (LCN) on each output line and routing information for identifying the output line are obtained, through a header conversion table, from the header of each cell which is an identifier on the input line, so that the cell switching is performed on the basis of the thus obtained routing information. In order to accumulate cells correspondingly to a plurality of output lines, a buffer memory is divided into a plurality of buffer areas corresponding to the output lines respectively. Each buffer area in which a cell is to be written on the basis of the routing information is designated by a storage address of the cell, while addresses of each buffer area are designated by a write address counter provided for each buffer area. The write address counter performs a count-up or increment operation by one address whenever a cell writing operation is carried out. The cell output is carried out by successively reading cells one by one from the output-line-corresponding address areas. To this end, a read address counter is provided for every buffer area so that cells are successively read from the addresses designated by the read address counters and transmitted to the output lines through an interface circuit and then the read address counter performs a count-up or increment operation by one address. Accordingly, the output-line-corresponding buffer areas can be controlled as a first-in first-out memory for every output line by comparing the values of the write address counter and the read address counter with each other.

Another aspect of the invention is as follows.

To realize a switching function of broadcast mode in which one and the same input cell is transmitted onto a plurality of output lines, broadcast cells are accumulated in a broadcast cell buffer area which serves as a first-in first-out memory in the same manner as the output-line-corresponding buffer memory area. Each broadcast cell is read from the broadcast cell buffer area at a predetermined frequency and accumulated in a broadcast cell register. For example, with logical channel number (LCN) contained in the header of the thus read-out cell as an address, an output line number for indicating the output line to which the cell is transmitted is read from an output line indication table and accumulated in an output line indication register. By transmitting the broadcast cell into an output interface circuit at a predetermined timing corresponding to the contents of the output line indication register, copies of the broadcast cell, instead of ordinary cells read from the buffer memory, can be transmitted to the plurality of output lines.

According to the present invention, even in the case where broadcast cells are concentrately inputted in the switching system, all the cells can stand by the transmission of the broadcast cell in the buffer memory as far as the total throughput in the switching system or throughput in every output line does not exceed a predetermined limit of output throughput. Accordingly, the probability that queuing of input cells cannot be carried out because of the resource occupation of the queues by the broadcast cell is reduced, so that the loss probability of cells by the concentration of broadcast cells can be reduced remarkably compared with the conventional system.

The foregoing and other objects, advantages, manner of operation and novel features of the present invention will be understood from the following detailed description when read in connection with the accompanying drawings.

DESCRIPTION OF THE PREFERRED EMBODIMENTS

Figure 3:
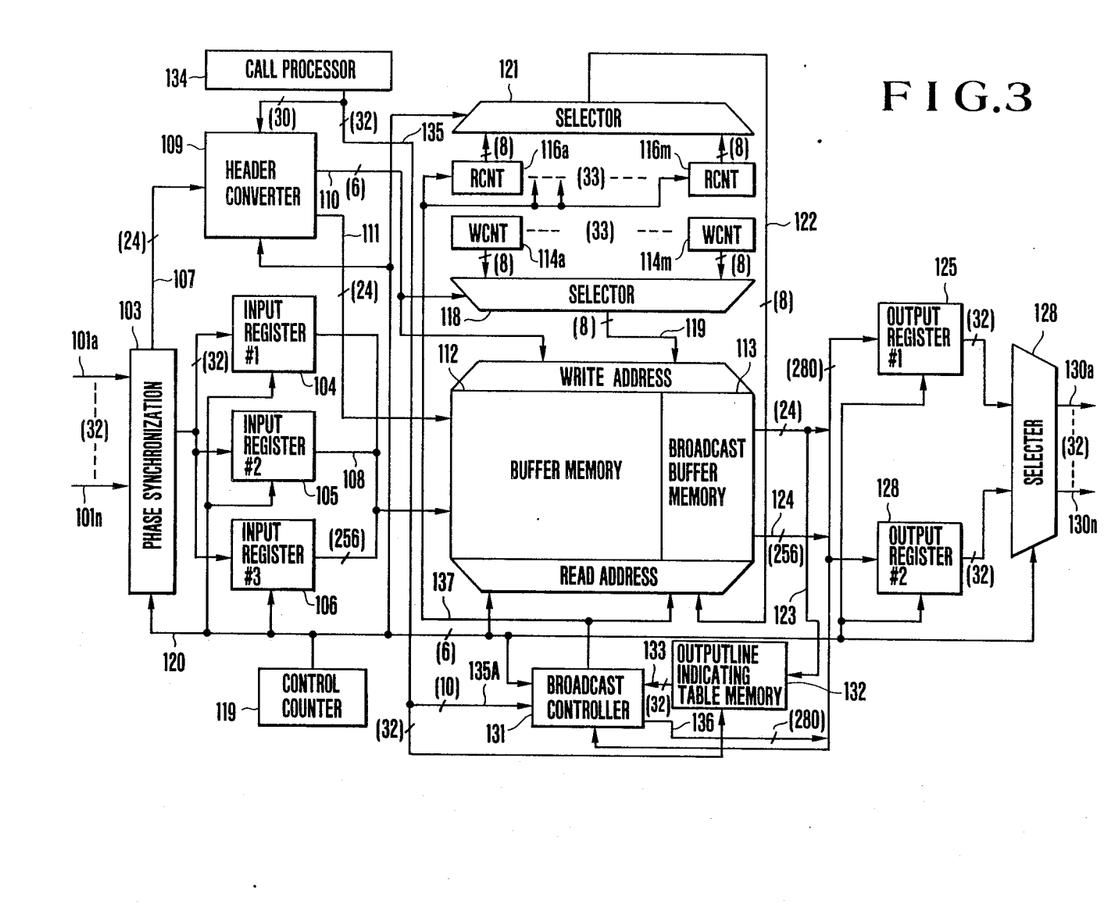
FIG. 3 is a diagram showing an example of the construction of the whole of the ATM switching system according to the present invention.

Referring to FIG. 3, there is shown the configuration of an embodiment of the switching system according to the present invention, which has 32 input lines 101a–101n and 32 output lines 130a–130n for switching 35-byte fixed-length cells in the same manner as the conventional system as shown in FIG. 1. A phase synchronization circuit 103 and input registers 104, 105 and 106 are provided to carry out a function equivalent to that of the multiplexer circuit 203 shown in FIG. 1. The construction and operation of the phase synchronization circuit 103 and the input registers 104, 105 and 106 will be described in detail later. In this embodiment, input cells are converted from serial data into parallel data by the phase synchronization circuit 103 and the input registers 104 to 106 in the same manner as the conventional system. Then, the respective headers of the cells are multiplexed and transmitted onto a line 107 and the respective user data of the cells are transmitted onto a line 108. The header is fed to a header conversion circuit 109 and converted, by the header conversion circuit 109, into routing information, that is to say, an output line number, to be fed onto a line 110 and LCN on the output line to be fed onto a line 111. The user data fed onto the line 108 is written, together with the LCN, into an idle area in the output-line-corresponding buffer memory area preliminarily designated in the buffer memory 112 corresponding to the routing information on the line 110. The routing information on the line 110 is composed of 6 bits, in which 5 bits are used for designating one of the 32 output lines 130a–130n and the remaining 1 bit is used as a broadcast cell indication bit. In this embodiment, all the broadcast cells are always written in a broadcast buffer memory 113 regardless of the destination of those cells.

Addresses for writing into and reading out of the buffer memories 112 and 113 are designated by write counters (WCNT) 114a to 114m and read counters (RCNT) 116a to 116m, respectively. 33 write counters and 33 read counters are provided corresponding to 32 output-line buffer memory areas and one broadcast buffer memory, so that an address for writing a cell into or an address for reading it from a buffer memory area corresponding to the aforementioned sections is designated. Each of those counters provides a counting-up or increment operation whenever a writing or reading operation is carried out. In the case of a writing operation, the output of one counter selected from the 33 write counters 114a to 114m by a selector 118 appears on a line 119 so that an address in the buffer memory 112 or 113 is designated by combination of the output on the line 119 with the routing information on the line 110.

In the case of output of cells from the switching system, the output signals from the read counters 116a to 116m are successively selected by a selector 121 in accordance with the output value from a control counter 119 and successively transmitted onto a line 122. The output signals of the read counters 116a to 116m, together with the output value of the counter 119 obtained on the line 120, are given as read addresses to a buffer memory 112 or a broadcast buffer memory 113. The header portion and the user data portion contained in the data read from the buffer memory 112 or 113 are transmitted to lines 123 and 124, respectively. Then the header portion and the user data portion are transmitted a selected one of the output lines 130a to 130n through output registers 125 and 126 and a selector 128. The output registers 125 and 126 and the selector 128 have a function equivalent to that of the demultiplexer circuit 216 of FIG. 1. The construction and operation of the output registers 125 and 126 and the selector 128 will be described in detail later.

The output from the control counter 119 is distributed into various parts of the switching system through a line 120 to thereby determine the sequence and timing for the periodic operation of the whole switching system.

In the following, a broadcast cell output method in the switching system is described. When a broadcast cell is read from the buffer memory 113, copies of the broadcast cell are generated by a broadcast control circuit 131 by the number equal to that of the output lines through which broadcast is to be carried out, and the copies of the broadcast cell are transmitted onto those output lines respectively.

Figure 4:
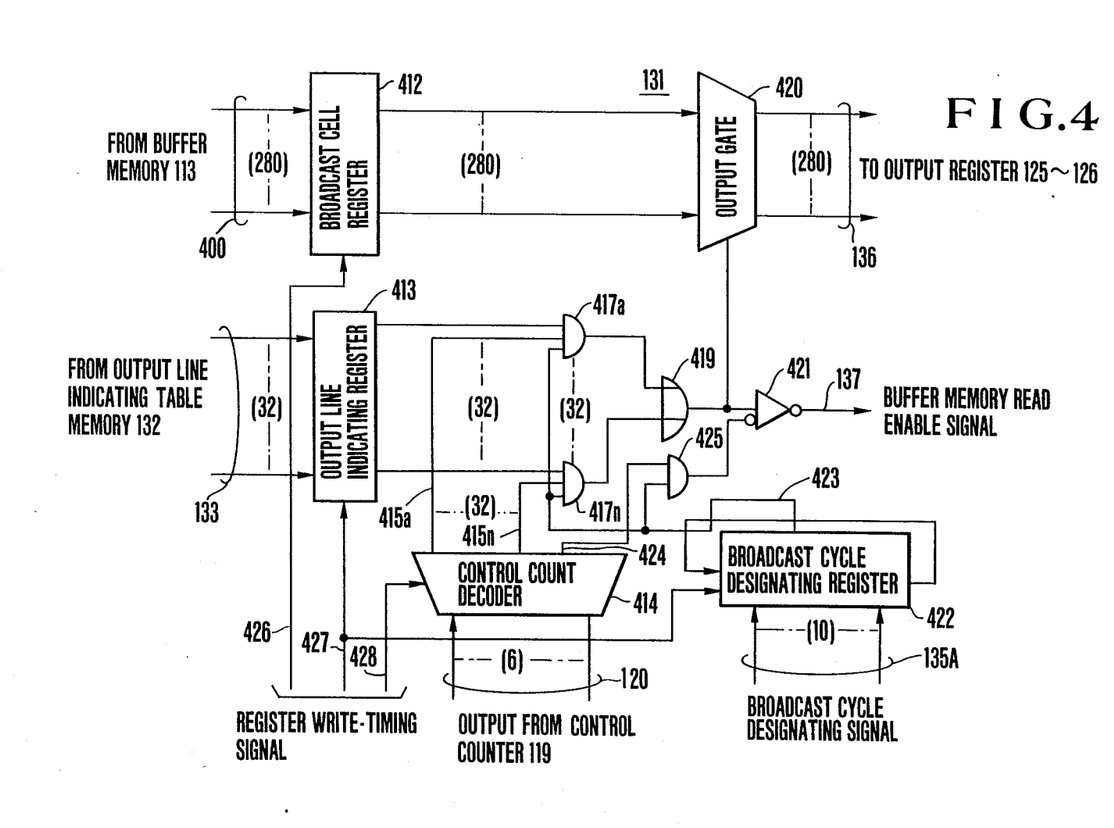
FIG. 4 is a detailed diagram of the broadcast control circuit 131 depicted in FIG. 3.

The construction of the broadcast control circuit 131 is shown in FIG. 4.

In FIG. 4 the reference numeral 400 designates a data (broadcast cell) read from the buffer memory. The data 400 is equivalent to a combination of the data obtained on the lines 123 and 124 shown in FIG. 3. In FIG. 4, the reference numeral 133 designates an output line from the output line indicating table memory 132 shown in FIG. 3. The reference numeral 120 designates the output line from the control counter 119 as already shown in FIG. 3. The reference numeral 135A designates broadcast cycle indication information as a part (10 bits) of the output line 135 from a call processor 134 shown in FIG. 3. The reference numeral 136 designates an input line to the output registers 125 and 126. The reference numeral 137 designates a buffer memory read enable signal. Register write-timing signals 426, 427 and 428 are generated from a timing signal generation circuit (not shown in FIG. 3) for generating various control timing signals necessary for the switching system on the basis of the output signal of the control counter 119.

Figure 5:
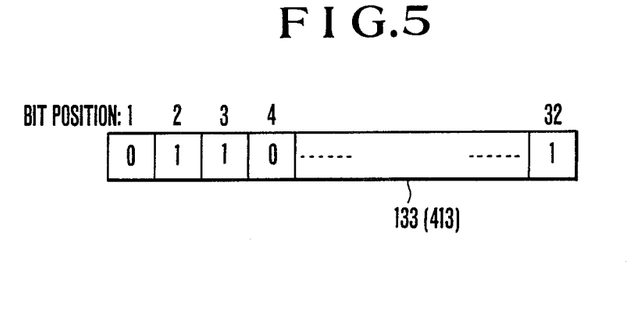
FIG. 5 is a view for explaining the output line indicating register 133 depicted in FIG. 4.

The broadcast cell 400 read from the broadcast buffer memory 113 is accumulated in a broadcast cell register 412. In this case, the header portion of the broadcast cell has been fed to the output line indicating table memory 132 shown in FIG. 3. Output line indication information of 32 bits is read from the output line indicating table memory 132 while the LCN contained in the header portion is used as a read address. The read results are accumulated in an output line indicating register 413 shown in FIG. 4 through the signal line 133. As shown in FIG. 5, the output line indication information is composed of 32 bits, in which some bits corresponding to the output lines to which the broadcast cell needs to be transmitted have "1", and the remaining bits corresponding to the output lines to which the broadcast cell does not need to be transmitted have "0".

The timing for reading cells from the output-line buffer areas of the buffer memory 112 is designated by the output 120 from the control counter 119. The output 120 is decoded by a control count decoder 414, so that the value on each of lines 415a to 415n is turned to "1" in the timing corresponding to the corresponding output line. The data on those lines 415a to 415n, together with the corresponding bits of the output line indicating register 413, are applied to AND gates 417a to 417n. An OR gate 419 performs logical OR of the output signals from the AND gates 417a to 417n. When the output from the OR gate 419 is "1", a bus output gate 420 is opened to thereby feed the contents of the broadcast cell register 412 onto the line 136. When the output from the OR gate 419 is "1", the output from a gate 421 takes "0" so that a signal for inhibiting reading of the buffer memory 112 is fed onto the line 137.

Figure 6:
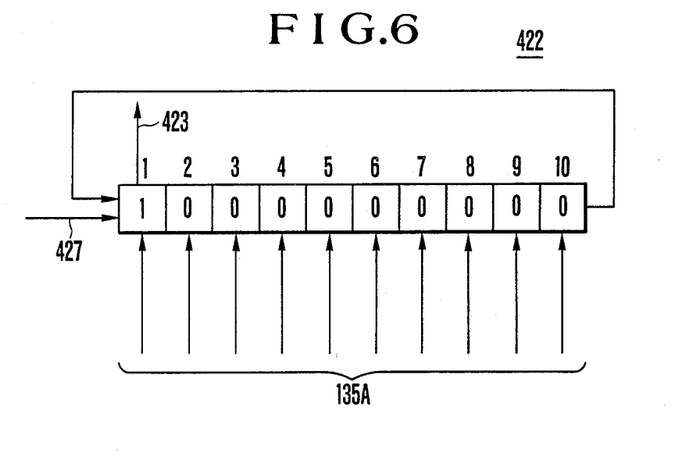
FIG. 6 is a view for explaining in detail the broadcast cycle designating register 422 depicted in FIG. 4.

The output from the control counter 119 changes periodically so that the reading from the respective buffer areas of the buffer memory 112 corresponding to the 32 output lines is designated successively in the order of the output line number and then the reading from the broadcast memory 113 is designated upon completion of the reading from the buffer memory area corresponding to the 32th output line. Upon completion of the reading from the broadcast memory 113, the output from the control counter 119 returns to its initial state so as to designate the reading from the buffer memory area corresponding to the first output line again. The period from the reading of the broadcast cell to the reading of the cell to be transmitted onto the 32th output line is defined as one cycle. A broadcast cycle designating register 422 shown in FIG. 4 is provided to designate the cycle in which the reading of the broadcast cell from the buffer memory 113 and the transmission of the broadcast cell onto output lines are to be carried out. The broadcast cycle designating register 422 is constituted by a cyclic shift register which makes a shifting operation whenever one cycle is terminated, as shown in FIG. 6. Each bit of the shift register 422 corresponds to one cycle. The shift register 422 changes its bits cyclically so that the first bit is shifted to the second bit, the second bit is shifted to the third bit, and the last bit (the 10th bit in the example of FIG. 6) is shifted to the first bit. The output of the first bit of the shift register 422 is fed to a line 423 to thereby control the output signals from the AND gates 417a to 417n and an AND gate 425.

In the cycle (broadcast cycle) where the first bit of the shift register 422 takes a value "1", each of the lines 424 and 423 in FIG. 4 respectively takes a value "1" when the value of the control counter 119 indicates the read-enable state of the broadcast buffer memory 113, so that the output from the AND gate 425 for performing logical AND of the values of the lines 424 and 423 takes a value "1". Accordingly, the output from the gate 421 takes a value "1" to thereby feed a buffer memory read enable signal to the line 137, so that the broadcast cell existing in an address in the broadcast buffer memory 113 indicated by the read counter 116m is read and accumulated in the broadcast register 412. The broadcast cell thus accumulated in the broadcast register 412 is transmitted onto the output lines corresponding to the bits of value "1" in the output line indicating register 413, at a predetermined timing designated by the control count decoder 414, as already mentioned above. Cells read from the buffer memory 112, instead of the broadcast cell, are transmitted onto the output lines corresponding to the bits of value "0" in the output line indicating register 413 even within the broadcast cycle. In the cycle where the first bit of the broadcast cycle designating register is "0", all the output signals from the AND gates 417a to 417n and 425 take a value "0". Accordingly, the buffer memory read enable signal on the line 137 takes a value "1" when the output-line-corresponding buffer memory 413 designated by the control counter 119 and, on the other hand, the signal takes a value "0" when the broadcast buffer memory is designated. Accordingly, the contents of the output-line-corresponding buffer memory 112 are transmitted to all the output lines but the broadcast cell is not transmitted. Further, reading from the broadcast buffer memory 113 is not carried out so that the contents of the broadcast cell register 412 are kept. It is apparent from the above description that the frequency of broadcast cell transmission is determined by the contents of the broadcast cycle designating register 422. If the all the contents of the register 422 are set to "0", no broadcast cell is transmitted. In the cycle where "1" is fed to the line 423, the broadcast cell is transmitted preferentially. Accordingly, the degree of priority of the broadcast cell increases as the number of bits of value "1" increases in the broadcast cycle designating register 422. When all the bits of the resister 422 are "1", the priority is highest. The call processor 134 determines a pattern to be written in the broadcast cycle designating register 422, considering factors such as a broadcast call set state, a used band and the like. Although FIG. 4 shows the case where the broadcast cycle designation information (pattern) is composed of 10 bits, it is to be understood that the number of bits can be suitably selected in accordance with the determination of the frequency of broadcast cell transmission.

In the following, a switching input portion which is constituted by the phase synchronization circuit 103 and the input registers 104, 105 and 106, and a switching output portion which is constituted by the output registers 125 and 126 and the selector 128 shown in FIG. 3 are described.

Figure 7:
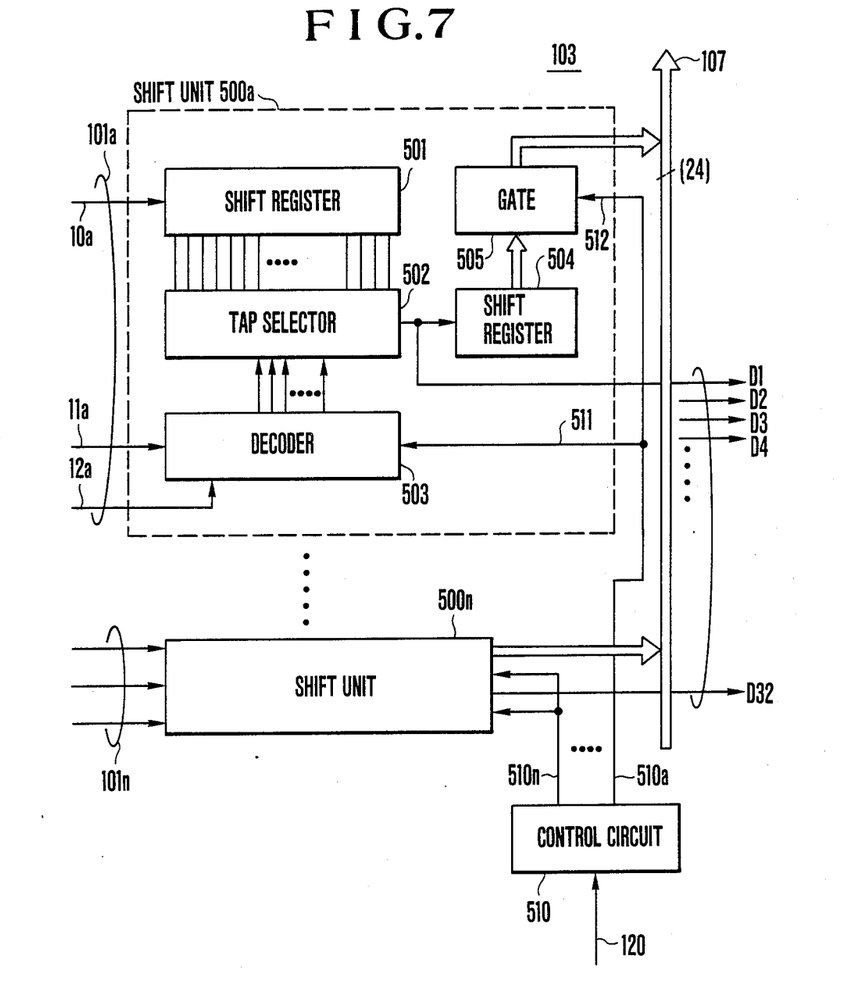
FIG. 7 is a diagram showing an example of the construction of the phase synchronization circuit 103 depicted in FIG. 3.

FIG. 7 shows an example of the detailed construction of the phase synchronization circuit 103. The phase synchronization circuit 103 performs phase synchronization so that the respective phases of the input cells received from the respective input lines 101a to 101m are shifted successively one byte at a time. The phase synchronization circuit 103 is composed of 32 shift units 500a to 500n corresponding to respective input lines, and a control circuit 510 for controlling the operation of the shift units 500a–500n.

For example, the shift unit 500a has a shift register 501 for receiving an input cell in the form of a serial signal from a data line 10a of the input line 101a, a tap selector 502 for selecting one of the taps provided corresponding to the bits of the shift register to thereby transmit the input cell onto an output line $D_1$, and a decoder 503 for designating the tap to be selected by the tap selector 502. A synchronous signal 11a for indicating the head of each input cell and an input cell transfer clock signal 12a are to the decoder 503. The current position of the input head bit in the shift register 501 is determined by counting the transfer clock. When an output timing signal 511 is received from the control circuit 510, the decoder 503 generates a selection signal corresponding to the count value, and the tap selector 502 selects one of the taps corresponding to the position of the head bit of the input cell. As a result, the input cell is serially transmitted onto the output line $D_1$ in synchronization with the output timing. A shift register 504 for receiving a header having a data length of 3 bytes and a gate 505 for controlling transmission of parallel output signals from the shift register 504 to the line 107 are provided on the output line from the tap selector 502. The gate 505 is opened by a timing signal 512 from the control circuit 510 so that the header portion of each cell is transmitted onto the line 107. The control circuit 510 feeds the timing signals (511, 512) to each of the shift units 500a–500n through the control signal lines 510a–510n respectively in the condition that the respective phases of the timing signals are shifted successively one byte at a time. Accordingly, the input cells with their phases shifted successively one byte at a time are transmitted to the respective output lines $D_1$ to $D_{32}$, and, on the other hand, the header portions of the respective input cells are successively transmitted onto the line 107.

Figure 8:
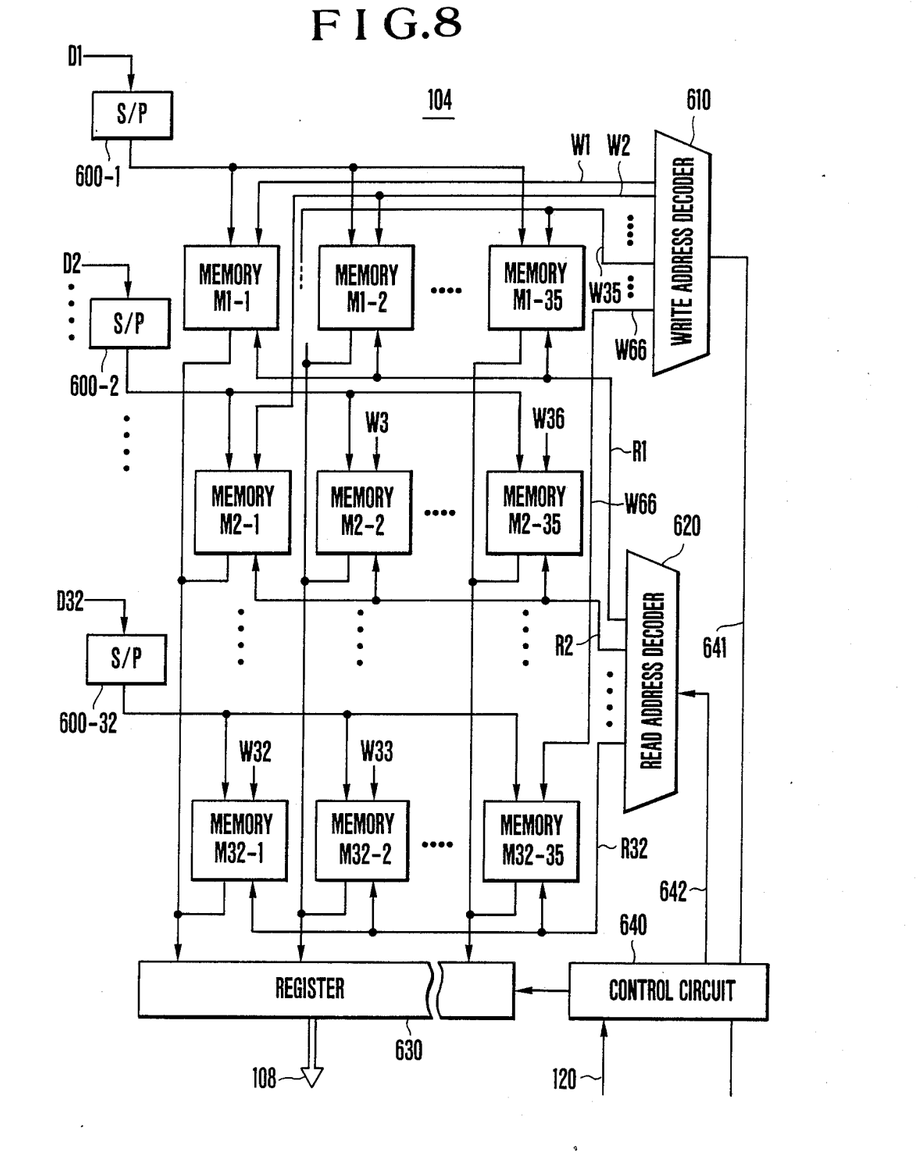
FIG. 8 is a diagram showing an example of the input register 104 depicted in FIG. 3.

FIG. 8 shows the construction of an embodiment of the input register 104. Other input registers 105 and 106 have the same construction as the input register 104. The input register 104 is composed of one-byte serial-to-parallel conversion circuits (S/P circuits) 600-1 to 600-32 connected to the output lines $D_1$ to $D_{32}$ from the phase synchronization circuit 103, 1-byte memory cells $M_{1-1}$ to $M_{32-35}$ arranged in the form of a matrix having 32 rows and 35 columns, a write address decoder 610, a read address decoder 620, and a control circuit 640. The output from each respective S/P circuit 600-l is made to be data written in the 35 memory cells $M_{l-1}$ to $M_{l-35}$ in the corresponding l-th row. The data read from those memory cells are fed to an output register 630 through corresponding column-direction lines.

The write address decoder 610 decodes the count value 641 given from the control circuit 640 to thereby generate write signals $W_1$ to $W_{66}$ successively. The write signal $W_1$ is generated at the timing when the S/P circuit 600-1 connected to the output line $D_1$ transmits the first byte of the first input cell, so that the aforementioned one-byte data is written in the memory cell $M_{1-1}$. The write signal $W_2$ is generated at the timing when the S/P circuit 600-2 connected to the output line $D_2$ transmits the first byte of the second input cell, so that the first one-byte data of the second input cell is written in the memory cell $M_{2-1}$ and, at the same time, the second one-byte data of the first input cell is written in the memory cell $M_{1-2}$. In short, write signals are successively generated in the same manner as described above while the memory cell access position is shifted in order. In the case of the 32th write signal $W_{32}$, the 32nd one-byte data of the first input cell is written in the memory $M_{1-32}$, the 31st one-byte data of the second input cell is written in the memory $M_{2-31}$, ..., and the first one-byte data of the 32th input cell is written in the memory cell In the case of the 33rd write signal $W_{33}$, the 33rd one-byte data of the first input cell is written in the memory $M_{1-33}$, the 32nd one-byte data of the second input cell is written in the memory $M_{2-32}$, and the second one-byte data of the 32nd input cell is written in the memory cell $M_{32-2}$. In the case of the last 66th write signal $W_{66}$, the 35th one-byte data of the 32nd input cell is written in the memory $M_{32-35}$. On the other hand, the reading of data from these memory cells is carried out by read signals $R_1$ to $R_{32}$ generated from the read address decoder 620. Those read signals are successively generated corresponding to the count value 642 from the control circuit 640. The read signal $R_1$ makes access to one-row of memory cells $M_{1-1}$ to $M_{1-35}$ at once. Similarly, the read signals $R_2$ to $R_{32}$ respectively make access to memory cells of one row which correspond each to one input cell (from the second input cell to the 32nd input cell). Thus, 35-byte (280-bit) data per input cell unit can be successively read into the register 630 from which 32-byte (256 bits) user data portion is outputted to the line 108.

Figure 9A:
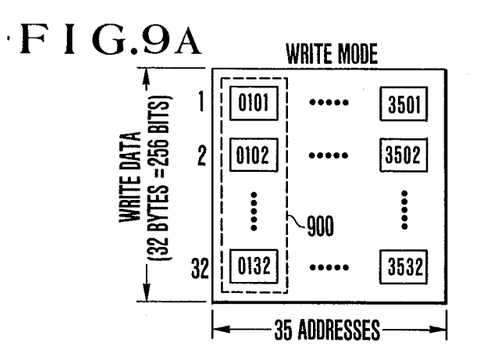
FIGS. 9A and 9B are views for explaining the function of the input register 104.
Figure 9B:
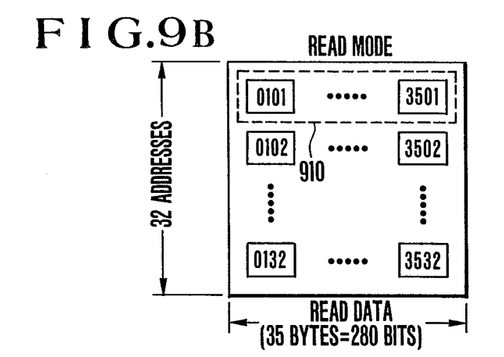

FIGS. 9A and 9B are views showing models of the function of the aforementioned register 104. In the write mode, as shown in FIG. 9A, 32-byte parallel input cell data blocks are written successively in the positions shifted one byte at a time. In the read mode, as shown in FIG. 9B, a 35-byte data block for each input cell, for example, a data block 910 having 35 bytes of from "0101" to "3501", is read at once as shown. The other input registers 105 and 106 have the same function as the input register 104. As will be described later, those three input registers 104, 105 and 106 are switched so as to be used successively to thereby constitute an input buffer of three input planes.

Figure 11:
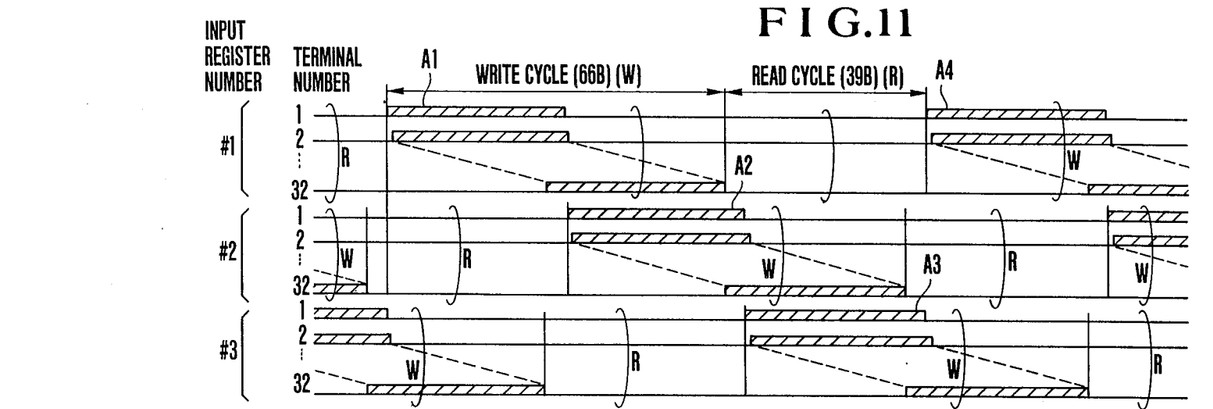
FIG. 11 is a timing chart showing the operation of the input registers 104 to 106.

FIG. 11 is a timing chart showing the relation between writing data into and reading data from the input registers 104 to 106. In FIG. 11, register numbers #1 to #4 correspond to the input registers 104 to 106, and terminal numbers 1 to 32 correspond to the input lines 101a to 101n and the output lines $D_1$ to $D_{32}$ from the phase synchronization circuit 103. In each of the registers, a write cycle and a read cycle are repeated alternately. Since the input cells have been successively fed to the input registers while successively shifting one byte at a time as shown by oblique lines, if the time (cycle) required for writing the one-byte data is represented by a symbol "B", the cycle of 35B is required for writing one-cell data and the cycle of 66B is required for writing 32-line input cells. In this embodiment, the next input cell (for example, $A_2$) from the line through which writing of an input cell (for example, $A_1$) in the first input register 104 (#1) is terminated is written in the second input register 105 (#2). When the writing of the input cell $A_2$ is terminated, the next input cell (for example, $A_3$) is written in the third input register 106 (#3). The next input cell (for example, $A_4$) is written in the first input register 104 (#1) again. In short, the input registers are used by turns. As a result, the idle time of 39B can be provided between the point of time when writing of 32 input cells in one input register is terminated and the point of time when writing of the next input cells is started. If data is read by one cell per cycle from the input register in which writing is terminated, the time of 32B is required for reading all the 32 cells. Accordingly, the idle time of 39B after the termination of input cell writing is used in each register so that all input cells can be successively read and written in the buffer memories 112 and 113. Data read from the buffer memories 112 and 113 is transmitted to the output lines 103a to 103n through the output registers 125 and 126 and the selector 128.

Figure 10A:
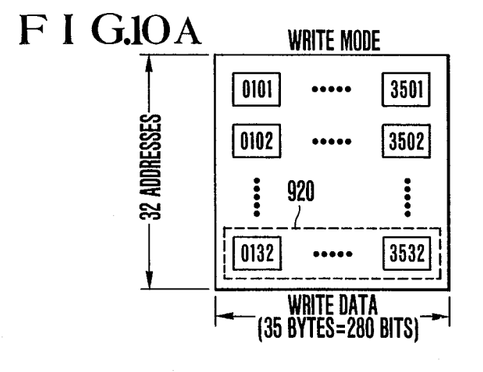
FIGS. 10A and 10B are views for explaining the function of the output register 125 depicted in FIG. 2.
Figure 10B:
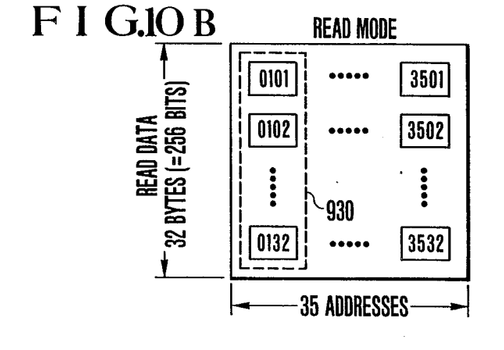

Writing of data into the output register 125 (or 126) is carried out so that one-cell data of 35 bytes read from the buffer memory is written into an address corresponding to the output line in the form of a parallel data block 920 composed of data of from "0132" to "3532" as shown in FIG. 10A. When the time required for writing one-cell data is represented by 1B, the time of 32B is required for writing 32-line cells into one output register. On the other hand, reading of data from the output register is carried out so that 32-byte data blocks (for example, block 930 composed of data from "0101" to "0132" as shown in FIG. 10B) formed by taking one byte from the head of each cell are successively accessed in parallel to read all the data for the time of 35B. The 32-byte data read from the output register is converted into serial signals by the selector 128, so that the serial signals are transmitted to the output lines 130a to 130n.

Figure 12:
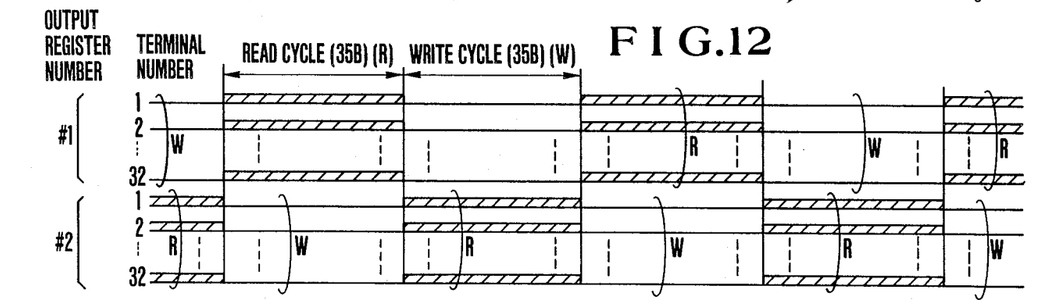
FIG. 12 is a timing chart showing the operation of the output registers 125 and 126.

By staggering write cycles and read cycles in the output registers 125 (#1) and 126 (#2) as shown in FIG. 12, writing of cell data from the buffer memory and reading of cell data from the output registers into the selector can be carried out respectively in a continuous manner. In the output register side, it is not necessary to shift the timing of cell transmission onto the lines successively one byte at a time unlike in the input register side.

According to the present invention, cells transmitted in the ATM switching system are merely accumulated in the buffer memory without requiring address queues unlike in the prior art. Accordingly, hardware for queuing is not required. Further, according to the invention, queues do not need to be provided for every service class, in the case where service classes are provided for handling cells within the ATM switching system. Accordingly, in this case, the advantage in reduction of hardware becomes greater.

We claim:

1. A packet switching system in which a plurality of fixed-length reception packets each composed of a header portion and a data portion are received respectively through a plurality of input lines, and each of the reception packets is selectively transmitted onto one of a plurality of output lines as a transmission packet after conversion of the header portion of the reception packet, said packet switching system comprising:

first interface means connected to said plurality of input lines, for receiving a serial signal of packets inputted from each of said input lines, and for outputting each of said packets with its header portion and data portion separated from each other;

buffer memory means divided into a plurality of buffer areas corresponding to said output lines, for storing said header-portion converted packets correspondingly to said output lines;

packet writing means connected to both of said first interface means and said buffer memory means, for generating converted header portions to be given to respective transmission packets in accordance with the contents of the header portions of the respective reception packets outputted from said first interface means, and for writing said transmission packets each composed of the converted header portion and the data portion of the corresponding reception packet outputted from said first interface means into said respective buffer areas corresponding to the output lines through which said transmission packets are to be outputted respectively by individually generating in a sequence plural writing addresses corresponding to storage locations in said respective buffer areas;

packet reading means connected to said buffer memory means, for reading said transmission packets out of said buffer areas of said buffer memory means in a first-in first-out manner by successively accessing said buffer areas; and second interface means connected between said buffer memory means and said plurality of output lines, for converting said transmission packets respectively read out of said buffer areas of said buffer memory means into serial signals respectively and for transmitting said respective serial signals onto said output lines corresponding to said buffer areas from which said transmission packets are read out.

2. A packet switching system according to claim 1, in which said packet writing means has a plurality of counter means arranged so that each of the counter means performs an increment operation up to a maximum value coincident with the packet storage capacity of each of said buffer areas whenever a transmission packet is written in a corresponding one of said buffer areas, said packet writing means generating a first address for selecting one of said buffer areas corresponding to the contents of the header portion of each reception packet and generating, through one of said counter means selected by said first address, a second address for indicating the packet storage position within said selected buffer area.

3. A packet switching system according to claim 1, in which said packet reading means has a plurality of counter means corresponding to said buffer areas, means for generating a first address for successively selecting said buffer areas, and counter selector means for selecting one of said counter means in accordance with said first address, each of said counter means operating to perform an increment operation up to a maximum value coincident with the packet storage capacity of each of said buffer areas whenever a transmission packet is read from a corresponding one of said buffer areas, and so as to generate a second address for indicating the packet storage position within selected buffer area when said counter means is selected by said counter selector means.

4. A packet switching system according to claim 3, in which said second interface means has memory means composed of storage areas for storing transmission packets read from said buffer memory means into a storage area corresponding to said first address, and parallel output means for transmitting said transmission packets stored in said memory means onto each output line in order from the head bit thereof.

5. A packet switching system in which a plurality of fixed-length reception packets each composed of a header portion and a data portion are received respectively through a plurality of input lines, and each of the reception packets is selectively transmitted onto one of a plurality of output lines as a transmission packet after conversion of the header portion of the reception packet, and in which each reception packet is transmitted to selected ones of said output lines in the case where the reception packet is a broadcast packet, said packet switching system comprising:

first interface means connected to said plurality of input lines, for receiving packets inputted from each of said input lines, and for outputting each of said packets with its header portion and data portion separated from each other;

buffer memory means connected to said first interface means and having a first buffer area including a plurality of buffer areas corresponding to said output lines for accumulating the header-converted packets correspondingly to said output lines and a second buffer area for accumulating the header-converted broadcast packets to be broadcast to said selected ones of said plurality of output lines;

packet writing means connected to both of said first interface means and said buffer memory means, for generating converted header portions to be given to respective transmission packets in accordance with the contents of the header portions of the respective reception packets outputted from said first interface means, and for writing said transmission packets each composed of the converted header portion and the data portion of the corresponding reception packet outputted from said first interface means into said first or second buffer area in accordance with said contents of the header portions by individually generating in a sequence plural writing addresses corresponding to storage locations in said respective buffer areas;

packet reading means connected to said buffer memory means, for reaching said transmission packets successively from said first buffer area of said buffer memory means correspondingly to said output lines and for reading said broadcast packet from said second buffer area of said buffer memory means at a predetermined frequency;

second interface means connected between said buffer memory means and said plurality of output lines, for temporarily storing said transmission packets successively read from said first buffer area of said buffer memory means and for transmitting said temporarily stored transmission packets parallelly onto said plurality of output lines; and broadcast packet generating means connected to operate in synchronism with said packet reading means for reproducing a plurality of broadcast packets from the broadcast packet read from said second buffer area of said buffer memory means and for supplying said plurality of reproduced broadcast packets, instead of the transmission packets read from said first buffer area, onto said second interface means at predetermined timing determined in accordance with the contents of the header portion of said broadcast packet.

6. A packet switching system according to claim 5, in which:

said first buffer area of said buffer memory means is composed of a plurality of subsidiary areas corresponding to said output lines, said packet reading means including means for effecting access to said subsidiary areas successively to thereby read transmission packets from said subsidiary areas one by one; and said broadcast packet generating means includes means for giving an inhibiting signal to said packet reading means when said packet reading means makes access to selected ones of said subsidiary areas corresponding to selected ones of said output lines determined in accordance with the contents of the header portion of said broadcast packet.

7. A packet switching system according to claim 5, further comprising means coupled to said broadcast packet generating means for designating the cycle in which said broadcast packet is read from said second buffer area by said packet reading means.

* * * * *